United States Patent [19]

Cheng

[11] Patent Number: 4,729,188

[45] Date of Patent: Mar. 8, 1988

[54] AUTOMATIC SPROUTS CULTURE BAG

[76] Inventor: Ming-Kwei Cheng, 3, Lane 134, Lien Cheng Road, Chung Ho, Taipei Hsien, Taiwan

[21] Appl. No.: 939,928

[22] Filed: Dec. 9, 1986

[51] Int. Cl.$^4$ ............................................. A01C 1/00
[52] U.S. Cl. ............................................. 47/14; 47/59
[58] Field of Search ............... 47/14, 59, 60, 61, 62, 47/63, 64, 82, 83

[56] References Cited

U.S. PATENT DOCUMENTS 4,392,328  7/1983  Walker .................................. 47/62

FOREIGN PATENT DOCUMENTS 517002   2/1953  Belgium ............................. 47/14
502668   3/1939  United Kingdom ................ 47/60
2078072  1/1982  United Kingdom ................ 47/59

Primary Examiner—Robert A. Hafer
Assistant Examiner—Bradley M. Lewis
Attorney, Agent, or Firm—Ladas & Parry

[57] ABSTRACT

An automatic sprouts culture bag having a plurality of longitudinal culture unit bags for storing sprout seeds, connected in series and may be hung on a lateral rod or wall for nursing sprouts in the air in conjunction with a water-dropping device arranged above said longitudinal culture unit bags for feeding water in drops from either a water bucket of a water faucet to said longitudinal culture unit bags, a plurality of siphons arranged in offset between two adjoining longitudinal culture unit bags for siphoning water from the upper longitudinal culture unit bag into the lower one for submerging the sprout seeds stored in an inner perforated bag received in said longitudinal culture unit bag, and an outer dark bag enclosing said longitudinal culture unit bags to prevent the sprouts from being exposed to the sunlight in order to form a dark environment for better growth of the sprouts.

4 Claims, 9 Drawing Figures

AUTOMATIC SPROUTS CULTURE BAG

BACKGROUND OF THE INVENTION

The present invention relates to an automatic sprouts culture bag having a plurality of longitudinal culture unit bags for storing sprout seeds, said bags being connected in series and may be hung on a lateral rod or wall for nursing sprouts in the air in conjunction with a water-dropping device arranged above said longitudinal culture unit bags for feeding water in drops from a water faucet into said longitudinal culture unit bags.

In U.S. Pat. No. 4,471,572 issued to Robert O. Young on Sept. 18, 1984, the gorwing strength of the bean sprouting is used to push a supporting plate upwardly for disengaging the stoppers which are engaged with the respective holes in the tube, in order to allow water to enter through the holes into the tube, and to pass through the tiny holes in the supporting plate to sprinkle over the beansprouts. However, the use of growing strength of bean sprouting is not reliable, because the whole bean sprouts do not grow at the same speed, therefore they will be very likely to cause inclination of the movable supporting plate; and the shaft would thus be stuck in the center tube. In addition, in order to take advantage of the growing strength of the bean sprouting, the beans need pre-germination, hence they should be soaked in water for a long time, e.g. 24 hrs before removal into the sprouter. Furthermore, owing to the fact that bean sprouts in the sprouter are exposed to the sunlight through the holes in the supporting plate as well as viewing hole, they green up and reach full growth quickly, hence they can not grow very high.

An object of the present invention is to provide a new automatic sprouts culture bag which is adapted for nursing the bean sprouts in a plurality of longitudinal culture unit bags which are connected in series and may be hung on a lateral rod or the wall, in order to save space.

The present invention provides an automatic sprouts culture bag having a plurality of longitudinal culture unit bags for storting sprouts seeds, said unit bags being connected in series and may be hung on a lateral rod or wall for nursing sprouts in the air. A water-drooping device is arranged above said longitudinal culture unit bags for feeding water in drops from either a water bucket or a water faucet to said longitudinal culture unit bags, a plurality of spiphon arranged in offset between two adjoining longitudinal culture unit bags for siphoning water from the upper longitudinal culture unit bag into the lower one for submerging the sprout seeds received in a perforated inner bag enclosed in said longitudinal culture unit bag, and an outer dark bag enclosing said longitudinal culture unit bags for preventing the sprouts from being exposed to the sunlight in order to form a dark growth environment for better growth of sprouts.

BRIEF DESCRIPTION OF THE DRAWINGS

An embodiment of the present invention will now be described by way of example with reference to the accompanying drawings in which:

Referring to FIG. 1, the automatic sprouts culture bag of this invention comprises a plurality of longitudinal culture unit bags 1, 1', 1" and 1'" (e.g. four bags in the embodiment of FIG. 1) which are made of soft plastic material and connected in series for storing sprout seeds and may be hung on a lateral rod 2 which may be attached to the wall by a pair of hanging ropes 21 or nails for nursing sprouts in the air in order to save culture space. A siphon is provided between each pair of adjoining unit bags to form a siphonic conduit so that water dropping from the top bag 1 may be siphoned down to the lower culture unit bag 1', and then in the same manner to the lower unit bagss 1" and 1'" for submerging sprout seeds. Water dropped into the upper bag is siphoned to the lower one when a predetermined siphoning level is reached. The siphons 3, 3', 3" and 3'" are arranged in offset for forming a S-shaped flowing path which goes through the sprout seeds 4 in each unit bags. The sprout seeds 4 are received in an inner perforated bag 5 which, in turn, is inserted in the unit bag 1', 1" or 1'" throoguh a lateral opening 13', 13" or 13'", and arranged on a triangular trellis 6 which is arranged on the bottom of the culture unit bag and serving as a support as well as a filter.

As shown in FIG. 1, the siphons 3, 3', 3" and 3'" are arranged in such a way that the water inlet of each siphon is set around 1" above the bottom of each bag, and the pre-determined level 15 is set at a point that, in coordination with the dropping speed of water, the sprout seeds in each bag will be submerged in an appropriate amount of water for an appropriate amount of time before the siphoning action in each bag takes place. Once reaching the predetermined level 15, the water in the culture unit bag will flow out through the siphon attached to said bag and the water level in the same bag will lower to beneath the inlet of said siphon.

Figures 1, 2:
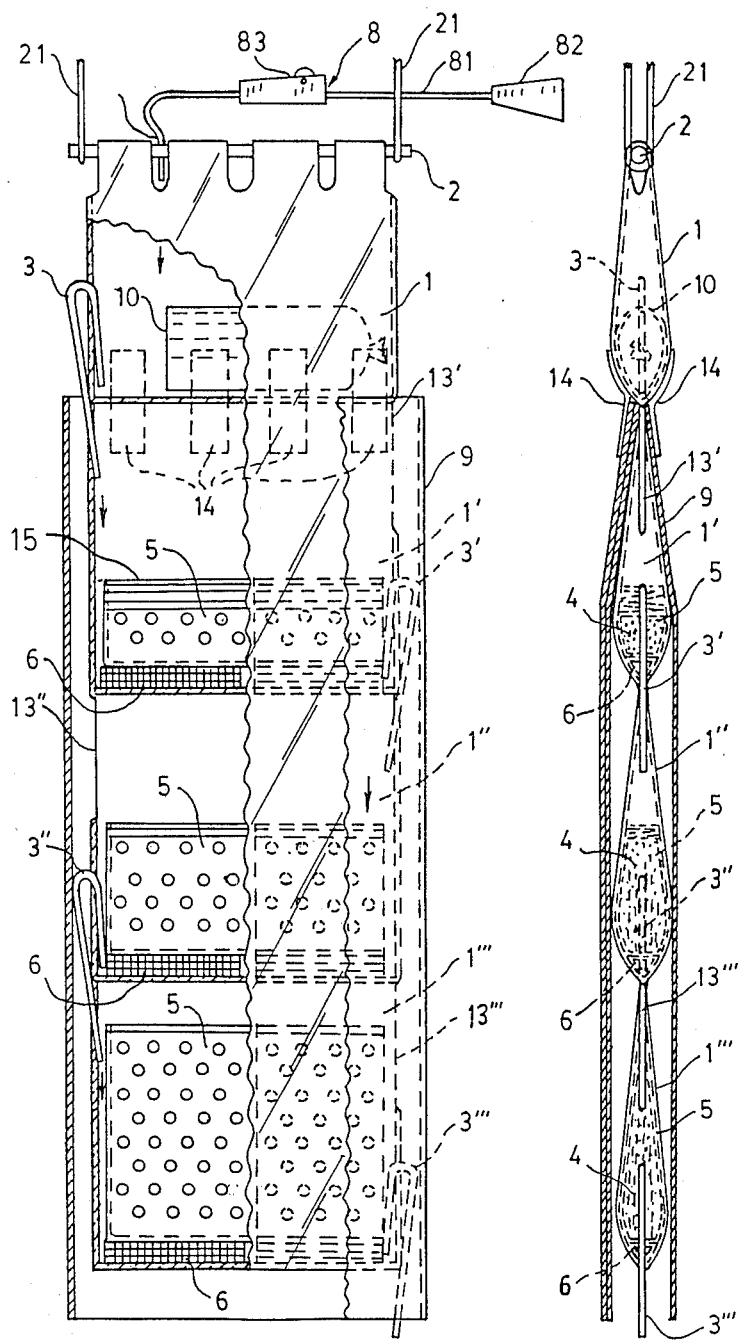
FIG. 1 is a front view of an embodiment of an automatic sprouts culture bag in accordance with the present invention.
FIG. 2 is a side view of the automatic sprouts culture bag of FIG. 1.
Figure 3:
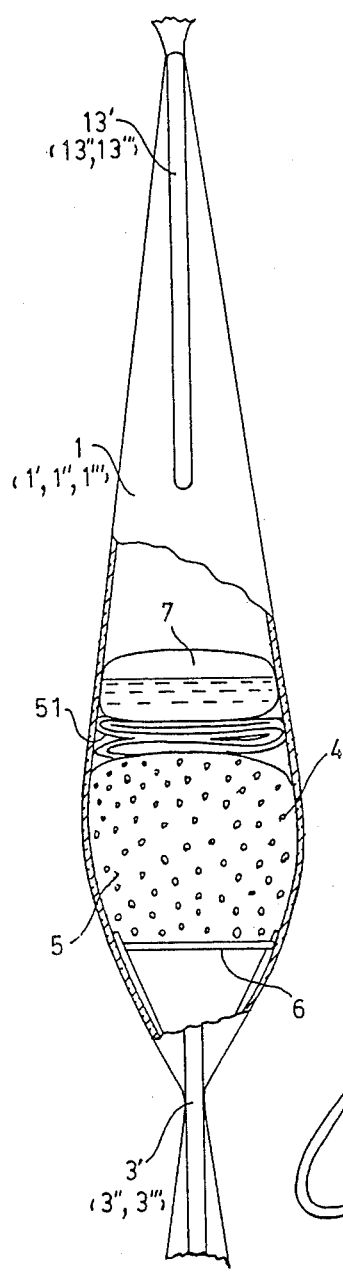
FIG. 3 is a fragmentary sectional side view of the automatic sprouts culture bag of FIG. 1.
Figure 4:
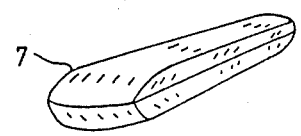
FIG. 4 is a perspective view of a water bag in accordance with the present invention.
Figure 5:
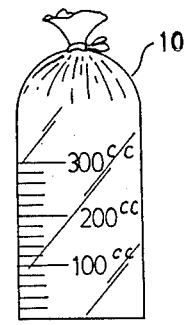
FIG. 5 is a perspective view of water-regulating bag in accordance with the present invention.
Figure 6:
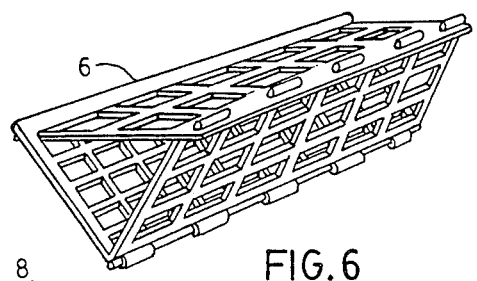
FIG. 6 is a perspective view of a triangular trellis in accordance with the present invention.
Figure 7:
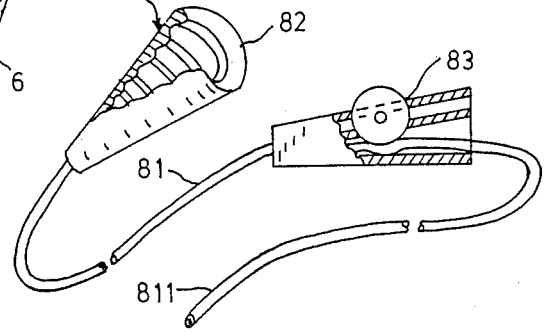
FIG. 7 is a partial sectional view of a water-dropping device in accordance with the present invention.

The three siphons 3, 3', 3" and 3'" decrease from up to down in diameter so that water flows at a lower speed through the lower culture unit bag than through the higher bag. As nutrients and minerals needed by the sprouts in the bags 1, 1', 1" and 1'" are consumed and thus decrease in amount as water flows along the bags, this arrangement allows water to stay longer in the bag 1' than in the bag 1, and longer in the bag 1" than in the bag 1'. Therefore, equal amount of nutrients and minerals will be absorbed by the sprouts in each culture bags as water in 1', 1" and 1'" can stay for a desired time, even when the said pre-determined level 15 in such bags 1', 1" and 1'" are overfilled.

The inner perforated bag 5 has an open free end 51 which may be folded in a z-shape and pressed by a water bag 7 filled with a suitable amount of water so as to allow the sprouts grow upwardly and freely. A dropper 8 is arranged above the longitudinal culture unit bags, which includes a hose 81 having an end 811 for insertion into the upper-most culture unit bag, a joint 82 for engaging with a water faucet (not shown), and a flow regulator 83 provided at the intermediate portion of the hose 81 for feeding water in drops from either a water faucet or a water bucket into the uppermost longitudinal culture unit bag 1 which serves as a reservoir. An outer dark bag 9 is formed by a light-proof sheet plastic which surrounds the longitudinal culture unit bags, and having two side edges overlapped each other, and hung on the unit bag 1 by means of the adhesive tape 14, for enclosing the longitudinal culture unit bags, and for preventing the sprouts therein from being exposed to the sunlight, thus increasing the growing speed of same.

As shown in phantom line of FIG. 1, a small closed regulating water bag 10 filled with water may be arranged in the uppermost longitudinal culture unit bag 1 for regulating the amount of water to be siphoned out of the bag 1 in order to suit different kind of sprout seeds.

Figures 8, 9:
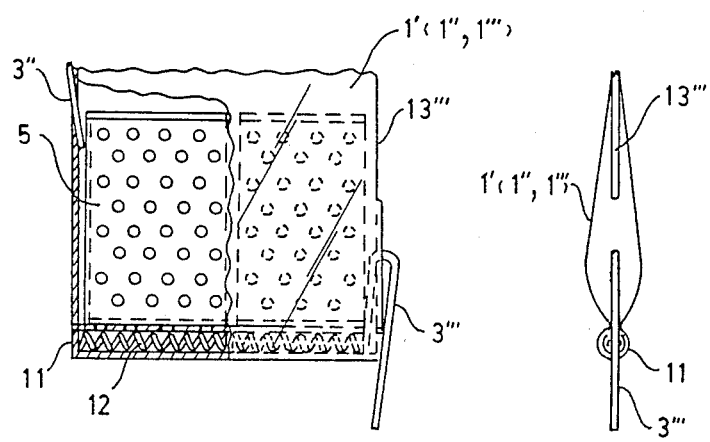
FIG. 8 is partial front side view of another embodiment of an automatic sprouts culture bag in accordance with the present invention.
FIG. 9 is a side view of FIG. 8.

Referring now to FIGS. 8 and 9, a partition 11 may be formed at the lower portion of the longitudinal culture unit bags 1', 1" and 1'" by means of discontinuously heat sealing of the same for receiving a helical spring 12 in substitution for the above said triangular trellis 6, which, spatially connected with the upper portion of the longitudinal culture unit bag 1', 1" and 1'", is used as a filter.

What is claimed is:

1. An automatic sprouts culture bag comprising a plurality of longitudinally arranged culture unit bags for storing sprout seeds, each culture unit bag being in communication with an adjacent culture bag by means of a siphon, the siphons being arranged in offset between adjoining longitudinal culture unit bags for siphoning suitable amounts of water from an upper culture unit bag into a lower culture unit bag forming an S-shaped flowing path and for submerging the sprout seeds, a siphon having a lesser diameter than that of a siphon above it, the plurality of longitudinal culture unit bags being hung on a lateral rod or wall for nursing sprouts in the air in conjunction with a water-dropping device arranged above said longituinal culture units bags for feeding water in drops from a water faucet to the sprout seeds through said longitudinal culture unit bags, the sprout seeds being received in an inner perforated bag in the logitudinal culture unit bag, and having an open free end folded in a Z-shape and pressed by a water bag filled with a suitable amount of water to permit sprouts to grow upwardly and freely.

2. A bag as claimed in claim 1 wherein said inner perforated bag is arranged on a triangular trellis disposed at the lower portion of said longitudinal culture unit bag.

3. A bag as claimed in claim 1 wherein said longitudinal culture unit bag has a partition formed at the lower portion thereof by means of discontinuously heat sealing of the same for receiving a helical spring, and communicating with the upper portion thereof.

4. A bag as claimed in claim 1 further comprising an outer dark bag for enclosing said longitudinal culture unit bags for preventing said sprouts from being exposed to the sunlight.

* * * * *